United States Patent
Gona et al.

(10) Patent No.: US 12,341,419 B2
(45) Date of Patent: Jun. 24, 2025

(54) CONFIGURABLE FAULT AND CONTROL SAFETY ARCHITECTURE FOR INVERTER SYSTEM

(71) Applicant: BorgWarner US Technologies LLC, Wilmington, DE (US)

(72) Inventors: Lokesh Gona, Kokomo, IN (US); Clinton W. Erickson, Russiaville, IN (US); Mitchell S. Cohen, Carmel, IN (US); John Mark Dikeman, Burnside, KY (US); Peter A. Laubenstein, Sharpsville, IN (US); Mark W. Gose, Kokomo, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 628 days.

(21) Appl. No.: 17/644,898

(22) Filed: Dec. 17, 2021

(65) Prior Publication Data

US 2023/0198377 A1 Jun. 22, 2023

(51) Int. Cl.
*H02M 1/32* (2007.01)
*G05B 19/042* (2006.01)
*G06F 13/42* (2006.01)
*H02M 7/5387* (2007.01)
(Continued)

(52) U.S. Cl.
CPC .......... *H02M 1/32* (2013.01); *G05B 19/0428* (2013.01); *G06F 13/4282* (2013.01); *H02M 7/53871* (2013.01); *H02P 27/08* (2013.01); *H02P 29/024* (2013.01); *G05B 2219/21109* (2013.01); *G05B 2219/25257* (2013.01)

(58) Field of Classification Search
CPC ...... G05B 19/0428; G05B 2219/21109; G05B 2219/25257; G06F 13/4282; H02M 1/32; H02M 7/53871; H02P 27/08; H02P 29/024
See application file for complete search history.

(56) References Cited

U.S. PATENT DOCUMENTS

| 9,960,732 B2 | 5/2018 | Höft |
| 2010/0027031 A1* | 2/2010 | Stimpson ............... B23Q 17/24 356/614 |

(Continued)

FOREIGN PATENT DOCUMENTS

| CA | 2208915 | * 12/1997 | ............... G06F 1/24 |
| EP | 2398141 A2 | 12/2011 | |

(Continued)

OTHER PUBLICATIONS

Fs6500, FS4500 Safety Power System Basis Chip with CAN FD and LIN Transceivers, Dec. 14, 2017.

(Continued)

*Primary Examiner* — Tameem D Siddiquee
(74) *Attorney, Agent, or Firm* — Joshua M. Haines; Bookoff McAndrews, PLLC

(57) ABSTRACT

A system for a direct-current (DC) to alternating current (AC) inverter includes: a memory configured to store instructions; a main microcontroller configured to execute the stored instructions to control the inverter during non-timing-critical operation; and a safety controller configured to control the inverter during timing-critical operation.

20 Claims, 8 Drawing Sheets

(51) Int. Cl.
  *H02P 27/08* (2006.01)
  *H02P 29/024* (2016.01)

(56) References Cited

U.S. PATENT DOCUMENTS

| | | | | |
|---|---|---|---|---|
| 2014/0078791 | A1* | 3/2014 | Gurudasani | H02M 7/4807 363/37 |
| 2014/0082434 | A1* | 3/2014 | Knight | G05B 19/0428 714/E11.179 |
| 2014/0218826 | A1 | 8/2014 | Majarov et al. | |
| 2015/0023075 | A1* | 1/2015 | Kim | H02M 7/48 363/56.03 |
| 2016/0248242 | A1* | 8/2016 | Petruzzi | H03K 17/082 |
| 2018/0279368 | A1* | 9/2018 | Butt | H04W 72/0453 |
| 2023/0114063 | A1* | 4/2023 | Iwasaki | H02M 7/48 363/13 |

FOREIGN PATENT DOCUMENTS

| | | |
|---|---|---|
| GB | 2559218 A | 8/2018 |
| WO | 2021181837 A1 | 9/2021 |

OTHER PUBLICATIONS

Greb et al., Hercules ™ Microcontrollers: Real-time MCUs for safety-critical products, Texas Instruments, Sep. 2011.

High-Voltage (HV) Inverter Saftey System Concept for ISO 26262 Compliance, 2020.

Vanjari et al., Integrating high RPM traction inverter, software resolver interface and DC/DC converter with ASIL D concept assessed C2000™ reference design, Texas Instruments, 2020.

International Search Report and Written Opinion in PCT/EP2022/086009, mailed Mar. 20, 2023 (11 pages).

Klaus Benjamin et al: "Contactless Electric Vehicle Charging—Development of a High Power Resonance Converter: Special Features during Design Process for an Experimental Setup", 2015 IEEE Vehicle Power and Propulsion Conference (VPPC), IEEE, Oct. 19, 2015.

Chen Peng et al: "Fault detection algorithm of inverter based on singular value decomposition nonlinear filtering", Computer Science and Automation Engineering (CSAE), 2011 IEEE International Conference on, Jun. 10, 2011.

* cited by examiner

CONFIGURABLE FAULT AND CONTROL SAFETY ARCHITECTURE FOR INVERTER SYSTEM

TECHNICAL FIELD

Various embodiments of the present disclosure relate generally to a configurable fault and control safety architecture for an inverter and, more particularly, to a configurable fault and control safety architecture for an inverter integrated using an application-specific integrated circuit with continuous fault monitoring and integrated safety functions.

BACKGROUND

Inverters, such as those used in an electric vehicle, for example, are responsible for converting high voltage DC into AC phase currents that drive a motor. A three phase inverter may have a bridge with six switches (e.g. IGBT/FET) that are controlled by Pulse-width modulation (PWM) signals generated by a microcontroller.

A fault may prevent the microcontroller from controlling the motor, and may potentially damage hardware and present a safety problem. Therefore, inverters require safety mechanisms against such hardware and software failures. A safety mechanism includes monitoring of faults and responding in a timely manner for the inverter to reach an appropriate safe state. Safety logic may be responsible for stopping PWM control and using the bridge to protect the system by changing the state of the switches to attain a safe state.

In a typical inverter, safety may be primarily controlled by a combination of hardware logic circuits (such as discrete logic, FPGA, or CPLD, for example) and a primary microcontroller. After capturing faults and an initial safe state selection by the hardware logic, safety decisions and fault monitoring are taken over by microcontroller software that may be executed at a defined periodic rate, and/or may use an interrupt for microcontroller software to address a fault. For example, microcontroller software may scan an input every 20 μs. This may make the system blind to dynamic fault scenarios. For example, software may or may not capture the changes when a fault that has occurred and cleared multiple times as microcontroller software doesn't monitor faults continuously (for example, at a rate faster than 10 μs, but rather at a defined periodic rate, or relies on an interrupt that may provide a response time of more than 10 μs.

A secondary safety device or logic circuitry is typically present for safety control in the presence of a faulted primary microcontroller, software, or other interfaces that prevent motor control. A secondary safety device may not monitor all faults due to increased complexity, printed circuit board (PCB) area, and cost. The most appropriate safe state may not be taken in some cases, due to lack of visibility to such faults. For example, when a vehicle is being towed because of a hardware failure that prevents turning on one side of the bridge switches, the microcontroller may not be turned on because an ignition sequence did not occur, and a secondary safety device may fail to take the system into a correct safe state.

The present disclosure is directed to overcoming one or more of these above-referenced challenges.

SUMMARY OF THE DISCLOSURE

In some aspects, the techniques described herein relate to a system for a direct-current (DC) to alternating current (AC) inverter, the system including: a memory configured to store instructions; a main microcontroller configured to execute the stored instructions to control the inverter during non-timing-critical operation; and a safety controller configured to control the inverter during timing-critical operation.

In some aspects, the techniques described herein relate to a system, wherein the safety controller includes: one or more match records configured to receive one or more inputs, wherein each match record among the one or more match records is configured to output a signal indicating whether the one or more inputs to the match record equal an input signature of the match record.

In some aspects, the techniques described herein relate to a system, wherein the safety controller includes: a response supervisor configured to receive one or more signals from the one or more match records and output a safety response based on the one or more signals.

In some aspects, the techniques described herein relate to a system, wherein the response supervisor of the safety controller is configured to progress to a current state among a plurality of states based on a previous state of the response supervisor and the one or more signals from the one or more match records, and output the safety response based on the current state of the response supervisor.

In some aspects, the techniques described herein relate to a system, wherein the one or more inputs include one or more of a fault, an output from another match record, or a counter configured to count a number of times a match record among the one or more match records has become active.

In some aspects, the techniques described herein relate to a system, wherein each match record among the one or more match records is assigned a respective priority, and wherein the response supervisor is further configured to progress to the current state among the plurality of states based on one or more of the previous state of the response supervisor, the one or more signals from the one or more match records, the respective priorities of the one or more match records, or a duration of time that the response supervisor has been in the current state.

In some aspects, the techniques described herein relate to a system, wherein the safety controller includes a counter configured to count a number of times a match record among the one or more match records has become active, and the counter is configured to be cleared by the main microcontroller.

In some aspects, the techniques described herein relate to a system, further including: a main microcontroller watchdog configured to monitor a health of the main microcontroller and communicate the health of the main microcontroller to the safety controller.

In some aspects, the techniques described herein relate to a system, wherein the safety controller receives inputs from the inverter and provides a safety output to the inverter, and the main microcontroller receives the inputs from the safety controller.

In some aspects, the techniques described herein relate to a system, wherein the safety controller is an application-specific integrated circuit (ASIC).

In some aspects, the techniques described herein relate to a system, wherein the safety controller provides a lower latency than the main microcontroller.

In some aspects, the techniques described herein relate to a system, wherein the main microcontroller includes software and one or more of a discrete logic component, a Complex Programmable Logic Device (CPLD), or a Field Programmable Gate Array (FPGA), and wherein the main microcontroller outputs a safety response to the inverter only through the safety controller.

In some aspects, the techniques described herein relate to a system, further including: the inverter; a set of input terminals configured to receive DC power; a switch group configured to receive a PWM signal from one or more of the main microcontroller or the safety controller and generate alternating current (AC) power using the received PWM signal; and a set of output terminals configured to output the generated AC power, wherein the one or more of the main microcontroller or the safety controller is configured to generate the PWM signal to operate the switch group.

In some aspects, the techniques described herein relate to a system, wherein the inverter is configured to receive the DC power and generate the AC power; and the system further includes: a motor configured to receive the generated AC power from the inverter, and to rotate based on the received AC power.

In some aspects, the techniques described herein relate to a method for controlling a direct-current (DC) to alternating current (AC) inverter, the method including: executing, by a main microcontroller of the inverter, instructions stored in a memory of the inverter to control the inverter during non-timing-critical operation; and controlling, by a safety controller of the inverter, the inverter during timing-critical operation.

In some aspects, the techniques described herein relate to a method, further including: receiving, by a set of input terminals of the inverter, DC power; receiving, by a switch group of the inverter, a PWM signal from one or more of the main microcontroller or the safety controller; generating, by the switch group of the inverter, alternating current (AC) power using the received PWM signal; and outputting, by a set of output terminals of the inverter, the generated AC power, wherein the one or more of the main microcontroller or the safety controller is configured to generate the PWM signal to operate the switch group.

In some aspects, the techniques described herein relate to a method, further including: receiving, by a motor connected to the output terminals of the inverter, the generated AC power from the inverter, and rotating based on the received AC power.

In some aspects, the techniques described herein relate to a system for a direct-current (DC) to alternating current (AC) inverter, the system including: a memory configured to store instructions; a safety controller configured to control the inverter; a main microcontroller configured to execute the stored instructions during non-timing-critical operation to output a signal to the safety controller; and a main microcontroller watchdog configured to monitor a health of the main microcontroller and output the health of the main microcontroller to the safety controller, wherein the safety controller is configured to output a PWM signal to a switch group of the inverter based on the signal from the main microcontroller, the health of the main microcontroller, and one or more inputs from the inverter.

In some aspects, the techniques described herein relate to a system, wherein the main microcontroller watchdog is configured to communicate with the safety controller using periodic Serial Peripheral Interface (SPI) messages and signals.

In some aspects, the techniques described herein relate to a system, wherein the main microcontroller is configured to communicate with the safety controller using periodic Serial Peripheral Interface (SPI) messages, and when the health of the main microcontroller is in good condition, the main microcontroller is configured to output the PWM signal to the switch group of the inverter when no fault is present in the inverter or by overriding the one or more inputs from the inverter to the safety controller.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
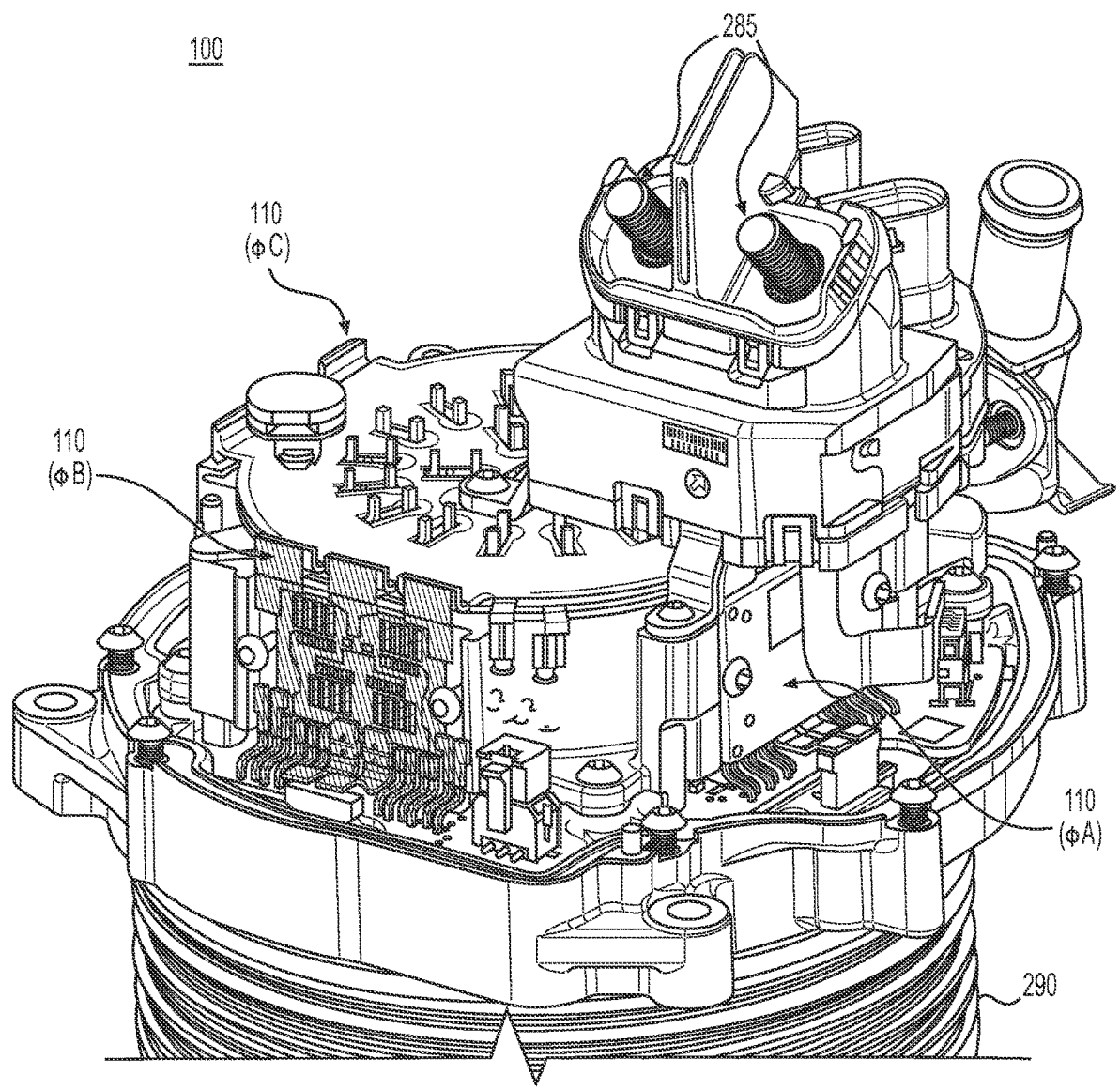
FIG. 1 depicts an inverter, according to one or more embodiments.

Various embodiments of the present disclosure relate generally to a configurable fault and control safety architecture for an inverter and, more particularly, to a configurable fault and control safety architecture for an inverter integrated using an application-specific integrated circuit with continuous fault monitoring and integrated safety functions. As will be apparent from the embodiments below, advantages to the disclosed systems and methods may include low latency due to minimized software dependency, improved safe state strategies, configurability to meet safety needs, and a smaller printed circuit board (PCB) area.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices Q1-Q6 may be described as switches or devices, but may refer to any device capable of controlling the flow of power in an electrical circuit. For example, devices Q1-Q6 may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 2:
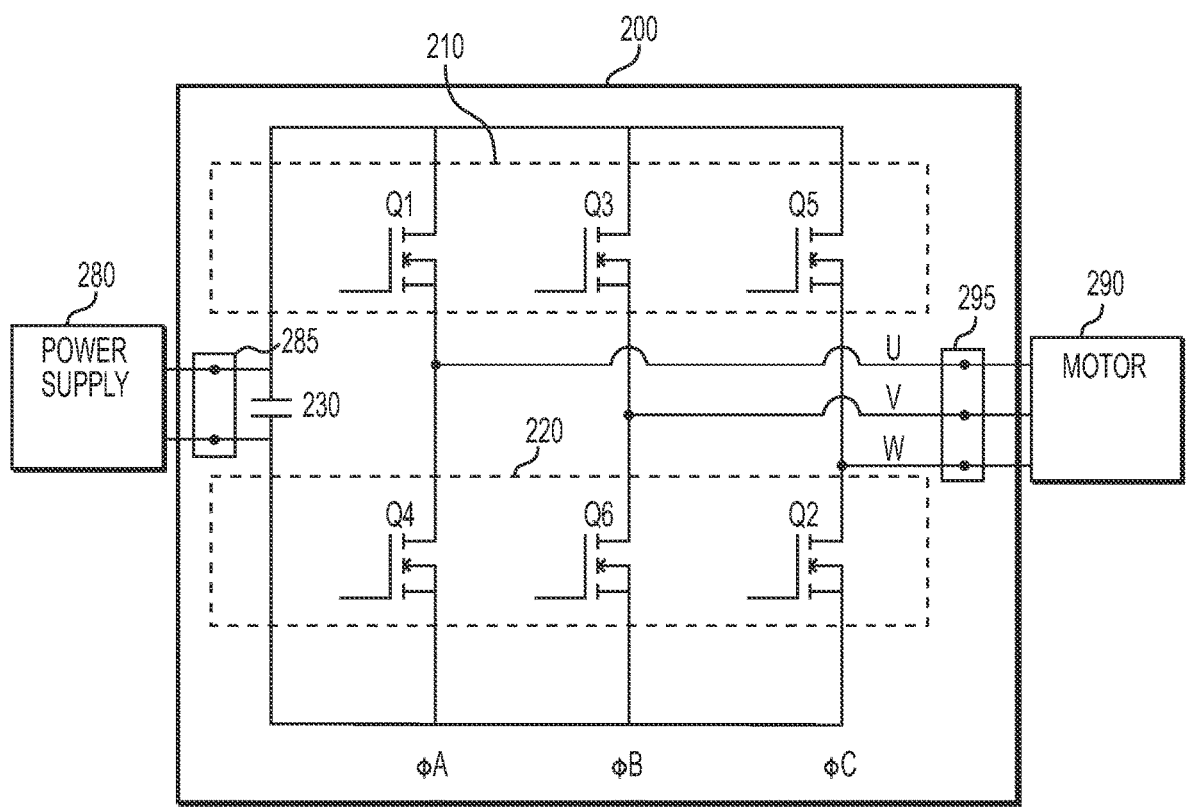
FIG. 2 depicts an electrical power schematic of an inverter in a connected system, according to one or more embodiments.

FIG. 1 depicts an inverter, according to one or more embodiments. FIG. 2 depicts an electrical power schematic of an inverter, according to one or more embodiments. The inverter may be used to convert DC power from a battery in an electric vehicle to AC power, to drive an electric motor of the electric vehicle, for example, but the embodiments are not limited thereto.

As shown in FIGS. 1 and 2, an inverter 100 may include heat sink 110 and power board 200, and may be connected to a DC power supply 280 and a motor 290. Power board 200 may include first three-phase switch group 210, and second three-phase switch group 220. A first phase U may correlate with ϕA including switches Q1 and Q4, a second phase V may correlate with ϕB including switches Q3 and Q6, and a third phase W may correlate with ϕC including switches Q5 and Q2, as illustrated in FIG. 2. First three-phase switch group 210 may include first phase switch Q1, second phase switch Q3, and third phase switch Q5. Second three-phase switch group 220 may include first phase switch Q4, second phase switch Q6, and third phase switch Q2. Switches Q1-Q6 may be metal-oxide-semiconductor field-effect transistors (MOSFET), for example, but are not limited thereto.

The first three-phase switch group 210 and second three-phase switch group 220 may be driven by PWM signals generated by inverter controller 300 (shown in FIG. 3) to convert DC power delivered via the set of input terminals 285 at capacitor 230 to three phase AC power at outputs U, V, and W via the set of output terminals 295 to motor 290. Additionally, although FIGS. 1 and 2 illustrate a three-phase inverter, the disclosure is not limited thereto, and may include single phase or multi-phase inverters.

Inverter controller 300 may include one or more controllers to generate the PWM signals during a normal condition of the inverter and during a fault condition of the inverter. Example fault conditions may include an over-voltage on the high voltage bus, an over-current in the phases, an electrical short in the switches, a software error, a power supply error, an under-voltage-lockout in the switches, or a desaturation fault in the switches. The above listed faults are merely examples, and the disclosure is not limited thereto.

Figure 3:
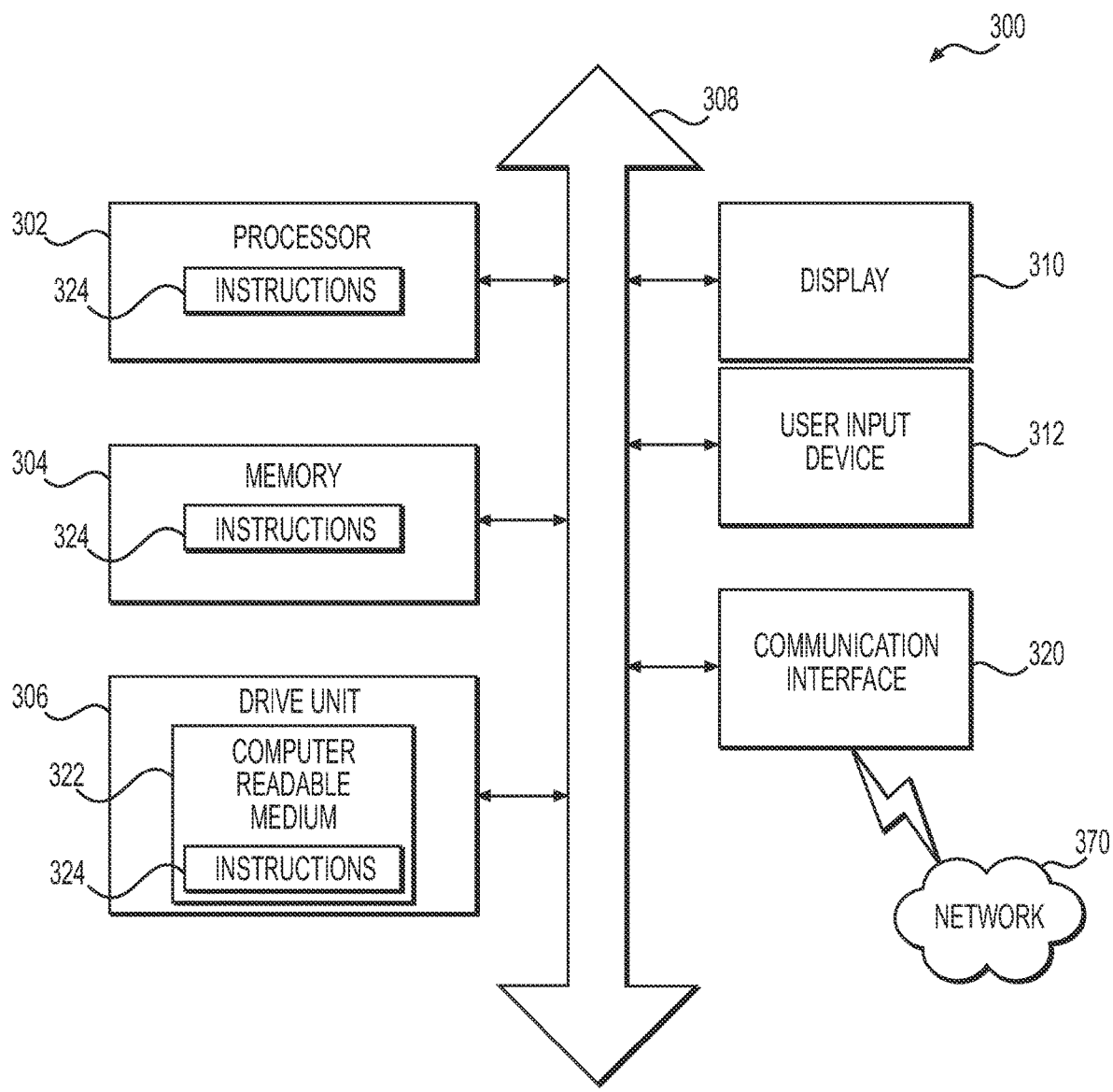
FIG. 3 depicts an implementation of a computer system that may execute techniques presented herein, according to one or more embodiments.

FIG. 3 depicts an implementation of an inverter controller 300 that may execute techniques presented herein, according to one or more embodiments.

The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As illustrated in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
FIG. 4 depicts a connected system including a control board, a power board, and a motor, according to one or more embodiments.

FIG. 4 depicts a connected system including a control board 500, a power board 200, and a motor 290, according to one or more embodiments. The control board 500 may, among other functions, generate a PWM signals and monitor a status of various components. The power board 200 may include the first three-phase switch group 210 and second three-phase switch group 220, which may be driven by the PWM signals generated by inverter controller 300 to convert DC power delivered via the set of input terminals 285 at capacitor 230 to three phase AC power at outputs U, V, and W via the set of output terminals 295 to motor 290. However, the disclosure is not limited thereto, and components and functions of the control board 500 and power board 200 may be provided on either or both of the control board 500 and power board 200. Additionally, the control board 500 and power board 200 may be provided as a single integrated board including both control board 500 and power board 200, or separately where each of the control board 500 and power board 200 is provided as one or more boards.

Figure 5:
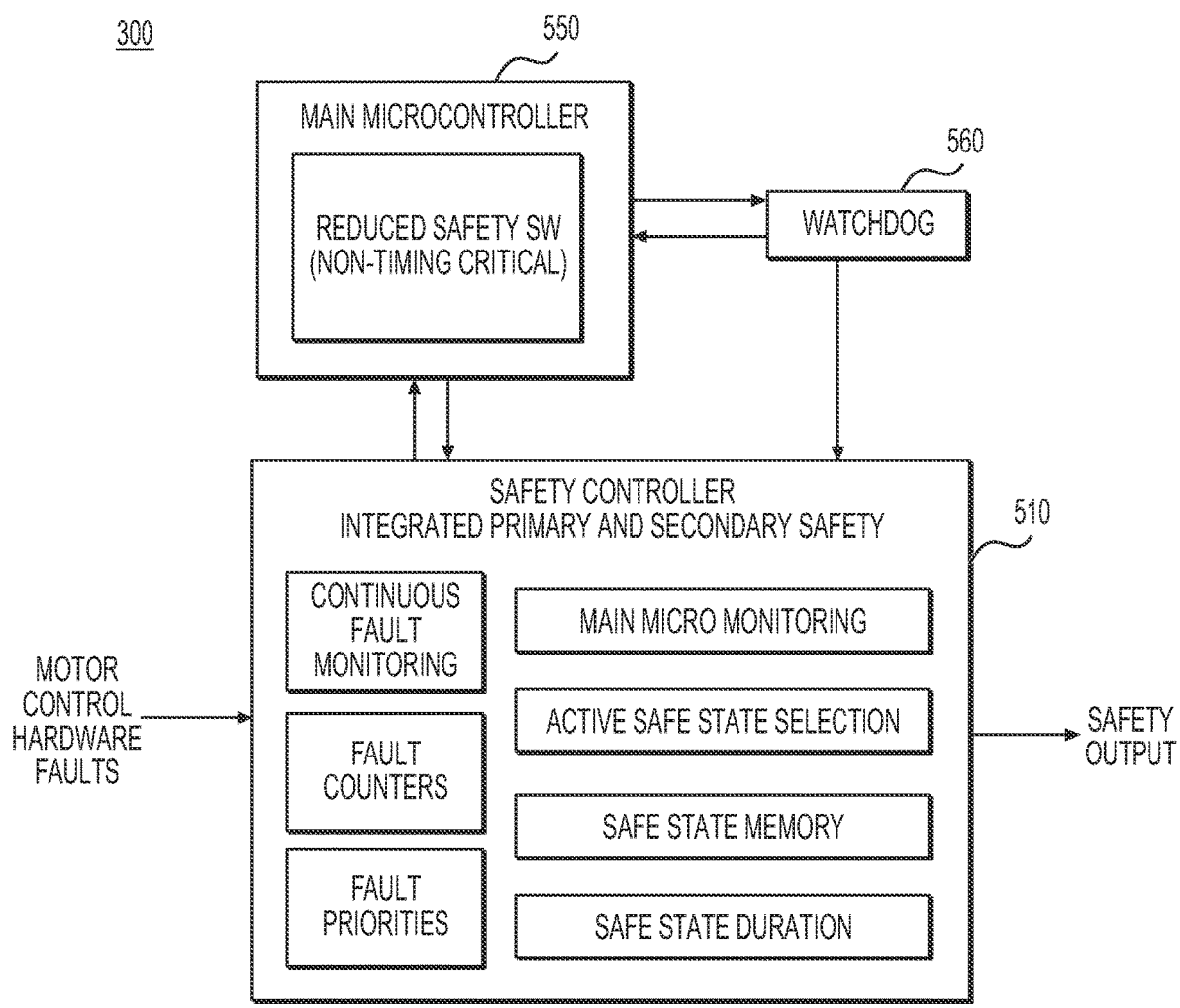
FIG. 5 depicts an inverter microcontroller and safety circuit, according to one or more embodiments.

FIG. 5 depicts a safety architecture for inverter 100, according to one or more embodiments. Inverter 100 may include control board 500, which may include inverter controller 300, which may include a safety architecture including safety controller 510, main microcontroller 550, and watchdog 560.

As shown in the high level block diagram of FIG. 5, the configurable fault and control architecture for inverter controller 300 may be integrated into safety controller 510, which may be an application-specific integrated circuit (ASIC), for example, or other device that may provide a response time of much faster than microcontroller software. As an example, safety controller 510 may have a response time of 50 ns, compared to a response time of 10 μs for main microcontroller 550. This architecture may provide continuous monitoring of faults, with the ability to keep track of fault counts and safe state selection strategies without the main microcontroller 550 powered up. This architecture integrates safety functions into safety controller 510, which makes it possible to combine fault scenarios and progress to the most appropriate safe state more quickly relative to performing timing-critical functions in main microcontroller 550.

The main microcontroller 550 may be used to control the inverter 100 in normal conditions and may provide non-timing-critical functions in a fault condition. A non-timing-critical function may be related to a fault in motor 290, for example, where the inverter 100 has been taken to a safe state. Because a non-timing critical function happens over several scanning or sampling periods of the main microcontroller 550, the main microcontroller 550 may adjust parameters of the inverter 100 to address the non-timing-critical function. The main microcontroller 550 may transmit and receive signals to and from the safety controller 510, and to and from a main microcontroller watchdog 560. The main microcontroller watchdog 560 may transmit and receive signals to and from the main microcontroller 550, and may transmit signals to the safety controller 510. In addition to the signals described above, the safety controller 510 may receive motor control hardware faults and generate a safety output signal.

The safety controller 510 may be used to control the inverter 100 in fault conditions and may provide timing-critical functions in a fault condition. A timing-critical function may be related to an excessive current, for example. Because a change in timing-critical function, e.g., current, may happen in less than one scanning or sampling period of the main microcontroller 550, the main microcontroller 550 may not capture the fault condition. However, the continuous monitoring of faults by the safety controller 510 may capture the fault condition, and may adjust parameters of the inverter 100 to address the timing-critical function, e.g., excessive current.

As shown in FIG. 5, the configurable fault and control architecture may include features such as continuous fault monitoring, fault counters, fault priorities, main microcontroller monitoring, active safe state selection, safe state memory, and safe state duration, for example.

For continuous fault monitoring, match records (MR) may be used. For match records, inputs may be matched with desired values (0 or 1), so that when the inputs match the input signature of the match record, the match record may be activated and output a true value (for example, false=0 and true=1, or vice versa). Multiple inputs may be combined with AND logic and/or combined with OR logic within a match record to make the output of a match record active.

The fault counters may represent a number of times a match record has become active. The fault counters may have a configurable threshold, and an output of a fault counter may become high when the threshold is reached. Additionally, a counter output may be an input to various match records.

For the fault priorities, the match records may be assigned priorities. In case of multi-fault scenarios, this may result in proceeding to a safe state for faults and/or match records with a highest priority.

For monitoring the main microcontroller 550, the main microcontroller 550 may read faults from the safety controller 510 via a Serial Peripheral Interface (SPI). The main microcontroller 550 in a normal condition has the ability to take control of the inverter switches from the safety controller 510 when there is no fault present or by overriding the inputs to the match records. The safety controller 510 may monitor the health of the main microcontroller 550 by using periodic SPI messages and signals from the main microcontroller watchdog 560, such as a challenge and response communication, for example.

The active safe state selection may be a safe state for a fault, and can be actively changed based on conditions such as bus voltage, motor speed, or duration.

The safe state memory describes the feature that the present state may be based not only a present fault, but also on a previous state. The response state (active or inactive) may be used as an input to a match record. Match record outputs may be used as inputs to other match records to combine logic for achieve various fault scenarios.

The safety output may be a response to a match record, and may be configurable logic to protect the system by taking control of the inverter switches to proceed to a safe state.

Figure 6:
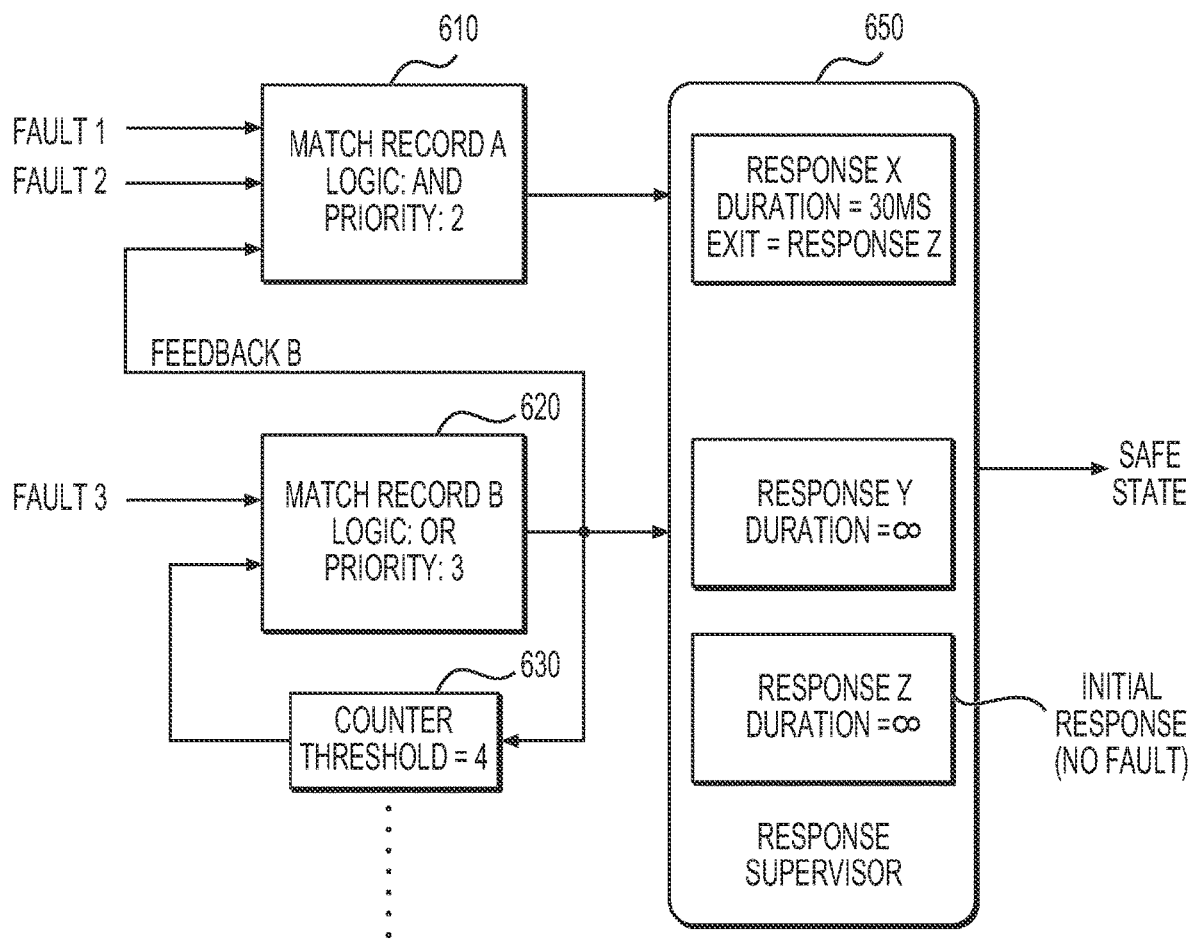
FIG. 6 depicts an implementation of the fault and control architecture, according to one or more embodiments.

FIG. 6 depicts an implementation of the fault and control architecture, according to one or more embodiments.

As shown in FIG. 6, match record A (610) may have a highest priority (priority=2), may have two fault inputs, and may receive feedback from match record B (620). The condition for match record A (610) to become active may be an AND of all the inputs. That is, if (fault 1=True) AND (fault 2=True) AND (feedback B=True), then match record A (610) may be activated, and may send an output to the response supervisor 650 indicating that match record A (610) is active.

Match record B (620) may have a second highest priority (priority=3), and may receive a fault input and an input from counter 630. Counter 630 may count a number of times match record B (620) has become active. The output of counter 630 may be 1 after the count reaches the threshold of 4. The count of counter 630 may be reset by the main microcontroller 550. The condition for match record B (620) to become active may be an OR of the inputs. That is, if (fault 3=True) OR (Counter B=True), then match record B (620) may be activated, and may send an output to the response supervisor 650 indicating that match record B (620) is active. Match record B (620) may be latched in an active state irrespective of input "fault 3" after the counter 630 threshold is reached.

Figure 7:
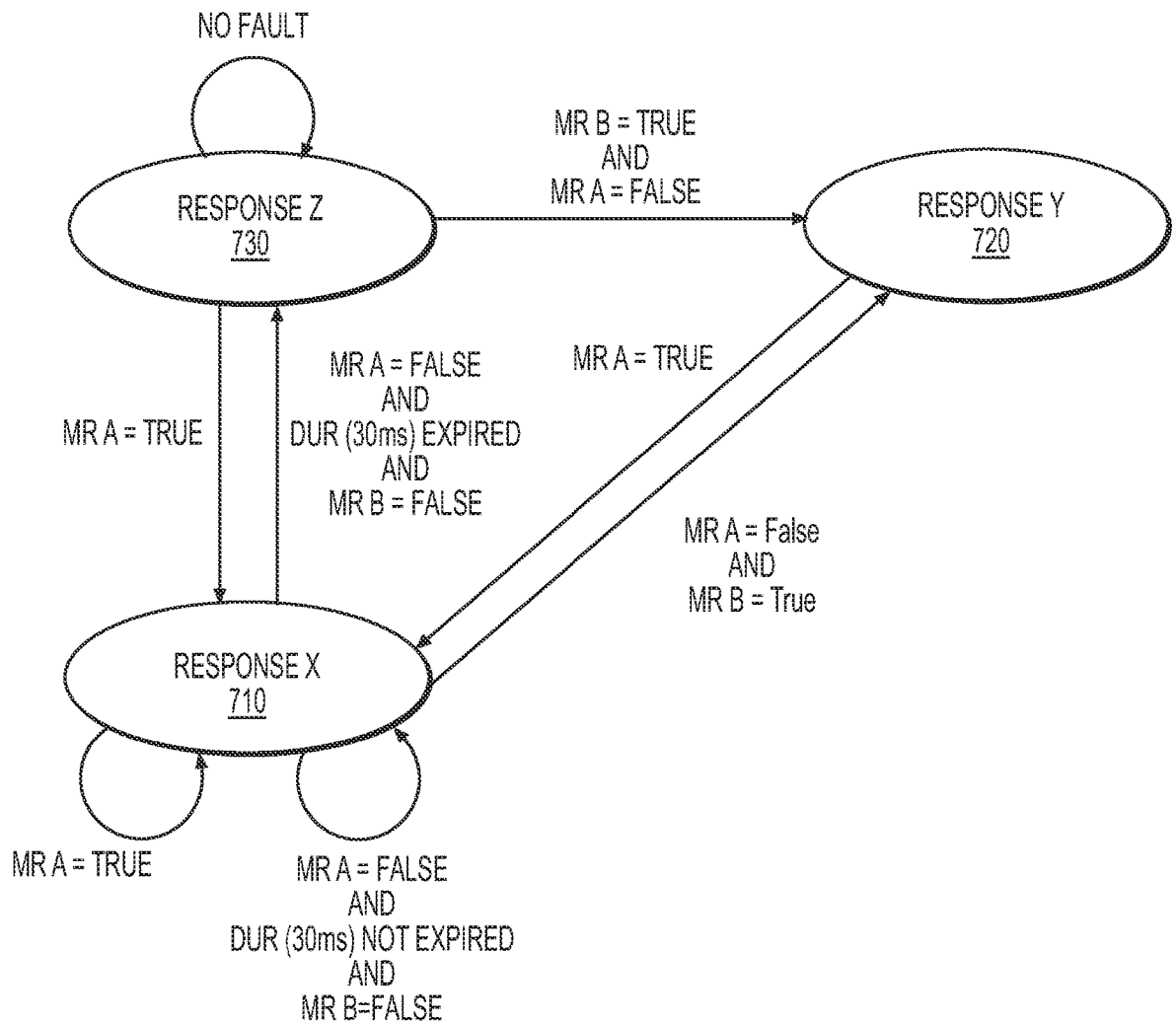
FIG. 7 depicts a state diagram illustrating transitions from one response to another, according to one or more embodiments.

FIG. 7 depicts a state diagram illustrating transitions from one response to another, according to one or more embodiments.

FIG. 7 shows example state transitions between responses for match records A (610) and B (620) described in FIG. 6. The output safe state of the response supervisor 650 may be dependent on match record status and various parameters such as match record priority and duration of the response supervisor 650 in a response state.

Response Z (730) may be the initial state of safety controller 510 prior to detecting a fault. In FIG. 7, a response state may or may not be a safe state. One or more match records may become active when a fault is detected, and safety controller 510 may provide programmed response Y (720). As shown in FIG. 7, when match record A (610) become active, safety controller 510 may provide programmed response X (710). In case of multiple active match records, only the highest priority among active match records may be considered. If a fault is healed (i.e. an input=false) and the response duration has expired, then safety controller 510 may exit to programmed exit response (i.e. from response X (710) to response Z (730)). As shown above, safety controller 510 may provide an output based not only on fault conditions, but also on a state of the safety controller 510 and a duration of the response supervisor 650 in a response state.

Figure 8:
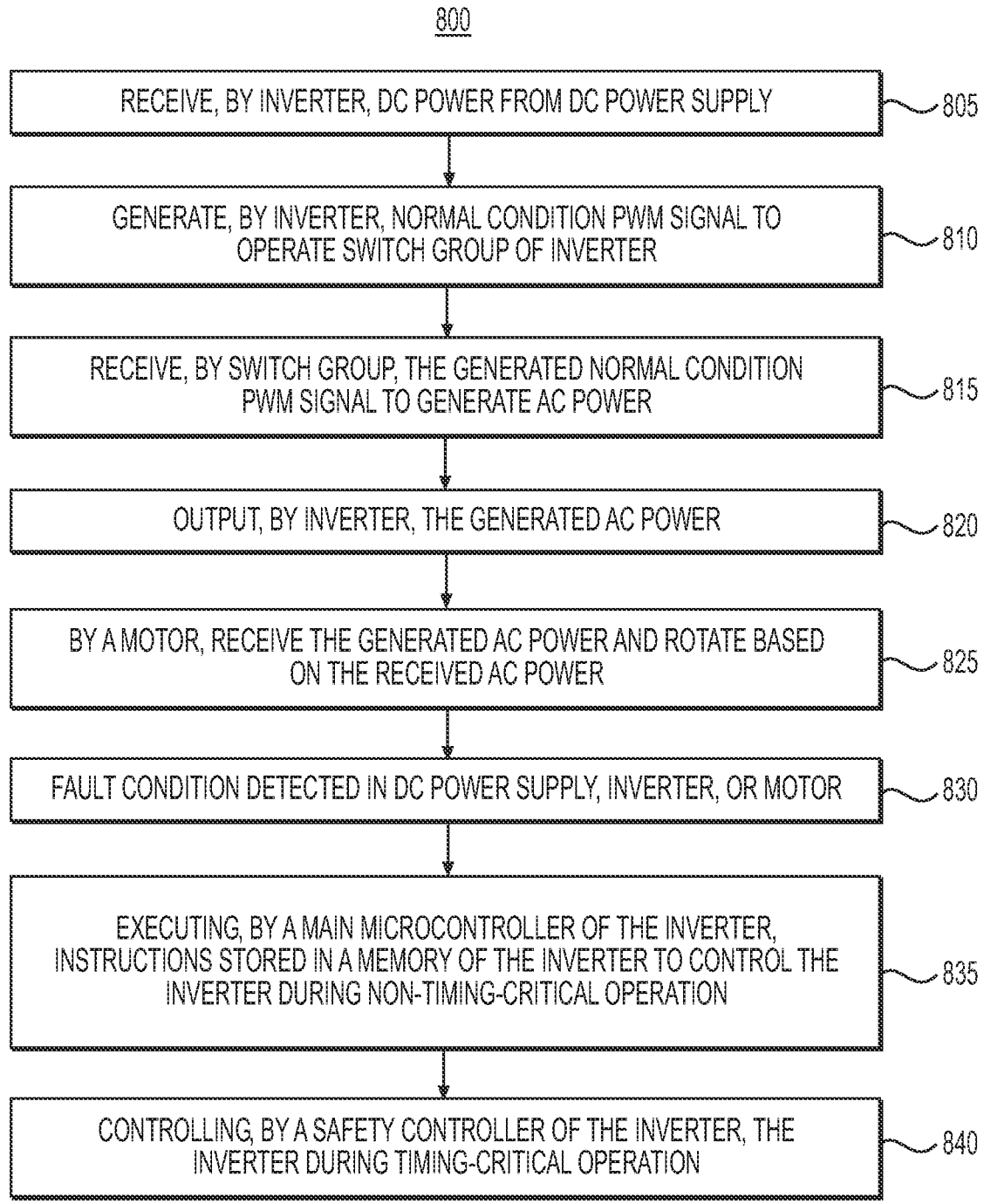
FIG. 8 depicts a method for controlling a direct-current (DC) to alternating current (AC) inverter, according to one or more embodiments.

FIG. 8 depicts a method 800 for controlling a direct-current (DC) to alternating current (AC) inverter 100, according to one or more embodiments.

Method 800 may include receiving, by a set of input terminals 285 of the inverter 100, DC power from DC power supply 280 (operation 805). First three-phase switch group 210 and second three-phase switch group 220 of the inverter 100 may receive PWM signals from one or more of the main microcontroller 550 or the safety controller 510 (operation 810). First three-phase switch group 210 and second three-phase switch group 220 of the inverter 100 may generate alternating current (AC) power using the received PWM signals (operation 815). A set of output terminals 295 of the inverter 100 may output the generated AC power (operation 820). The one or more of the main microcontroller 550 or the safety controller 510 may be configured to generate the PWM signals to operate the first three-phase switch group 210 and second three-phase switch group 220 of the inverter 100.

A motor 290 may be connected to the output terminals 295 of the inverter 100, may receive the generated AC power from the inverter 100, and may rotate based on the received AC power (operation 825). A fault condition may be detected in the DC power supply 280, inverter 100, or motor 290 (operation 830). A main microcontroller 550 of the inverter 100 may execute instructions stored in a memory 304 of the inverter 100 to control the inverter 100 during non-timing-critical operation (operation 835). A safety controller 510 of the inverter 100 may control the inverter 100 during timing-critical operation (operation 840).

As described in the embodiments above, advantages to the disclosed systems and methods may include low latency due to minimized software dependency, improved safe state strategies, configurability to meet safety needs, and a smaller printed circuit board (PCB) area. The disclosed systems and methods may integrated using an ASIC and may addresses problems with the convention solutions by continuous monitoring of faults, keeping track of fault count and safe state selection strategies without the microcontroller powered up, and may integrate safety functions, which makes it possible to combine fault scenarios and proceed to the most appropriate safe states.

Embodiments of the disclosed systems and methods do not require or include hardware logic that captures faults and then interrupts the main microcontroller. Embodiments of the disclosed systems and methods do not require or include hardware logic to immediately take the system into an initial safe state.

Because safety decisions and fault monitoring are not taken over by microcontroller software that is executed at a defined periodic rate, embodiments of the disclosed systems and methods are not blind to dynamic fault scenarios. Embodiments of the disclosed systems and methods capture changes when a fault has occurred and cleared multiple times because the disclosed systems and methods monitor faults continuously rather than periodically.

Embodiments of the disclosed systems and methods can monitor all faults without increased complexity, PCB area, or cost. The most appropriate safe state can be taken in some cases, due to visibility to such faults. For example, if a vehicle is being towed because of a hardware failure that prevents turning on one side of the bridge switches, and the main microcontroller is not turned because there was no ignition sequence, embodiments of the disclosed systems and methods can still take the system into the correct safe state.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for a direct-current (DC) to alternating current (AC) inverter, the system comprising:
    a memory configured to store instructions;
    a main microcontroller configured to execute the stored instructions to control the inverter during non-timing-critical operation, the main microcontroller having a first sampling period;
    a safety controller that is separate from the main microcontroller and configured to control the inverter during timing-critical operation, the safety controller having a second sampling period; and
    a main microcontroller watchdog configured to monitor a health of the main microcontroller and output the health of the main microcontroller to the safety controller,
    wherein the second sampling period is shorter than the first sampling period such that the safety controller is configured to capture a timing-critical fault that occurs in a period of time that is less than the first sampling period.

2. The system of claim 1, wherein the safety controller includes:
    one or more match records configured to receive one or more inputs,
    wherein each match record among the one or more match records is configured to output a signal indicating whether the one or more inputs to the match record equal an input signature of the match record.

3. The system of claim 2, wherein the safety controller includes:
    a response supervisor configured to receive one or more signals from the one or more match records and output a safety response based on the one or more signals.

4. The system of claim 3, wherein the response supervisor of the safety controller is configured to progress to a current state among a plurality of states based on a previous state of the response supervisor and the one or more signals from the one or more match records, and output the safety response based on the current state of the response supervisor.

5. The system of claim 4, wherein the one or more inputs include one or more of a fault, an output from another match record, or a counter configured to count a number of times a match record among the one or more match records has become active.

6. The system of claim 5, wherein each match record among the one or more match records is assigned a respective priority, and
    wherein the response supervisor is further configured to progress to the current state among the plurality of states based on one or more of the previous state of the response supervisor, the one or more signals from the one or more match records, the respective priorities of the one or more match records, or a duration of time that the response supervisor has been in the current state.

7. The system of claim 2, wherein the safety controller includes a counter configured to count a number of times a match record among the one or more match records has become active, and the counter is configured to be cleared by the main microcontroller.

8. The system of claim 1, wherein the main microcontroller watchdog is configured to communicate with the safety controller using periodic Serial Peripheral Interface (SPI) messages and signals.

9. The system of claim 1, wherein the safety controller receives inputs from the inverter and provides a safety output to the inverter, and the main microcontroller receives the inputs from the safety controller.

10. The system of claim 1, wherein the safety controller is configured to continuously monitor faults and provide safe state selection strategies for the inverter without the main microcontroller powered up.

11. The system of claim 1, wherein the safety controller provides a lower latency than the main microcontroller.

12. The system of claim 11,
    wherein the main microcontroller includes software and one or more of a discrete logic component, a Complex Programmable Logic Device (CPLD), or a Field Programmable Gate Array (FPGA), and
    wherein the main microcontroller outputs a safety response to the inverter only through the safety controller.

13. The system of claim 1, further comprising:
    the inverter;
    a set of input terminals configured to receive DC power;
    a switch group configured to receive a PWM signal from one or more of the main microcontroller or the safety controller and generate alternating current (AC) power using the received PWM signal; and
    a set of output terminals configured to output the generated AC power,
    wherein the one or more of the main microcontroller or the safety controller is configured to generate the PWM signal to operate the switch group.

14. The system of claim 13,
    wherein the inverter is configured to receive the DC power and generate the AC power; and
    the system further comprises:
    a motor configured to receive the generated AC power from the inverter, and to rotate based on the received AC power.

15. A method for controlling a direct-current (DC) to alternating current (AC) inverter, the method comprising:
    executing, by a main microcontroller of the inverter, instructions stored in a memory of the inverter to control the inverter during non-timing-critical operation, the main microcontroller having a first sampling period;
    controlling, by a safety controller of the inverter that is separate from the main controller, the inverter during timing-critical operation, the safety controller having a second sampling period;
    monitoring, by a main microcontroller watchdog of the inverter, a health of the main microcontroller; and outputting, by the main microcontroller watchdog, the health of the main microcontroller to the safety controller, wherein the second sampling period is shorter than the first sampling period such that the safety controller is configured to capture a timing-critical fault that occurs in a period of time that is less than the first sampling period.

16. The method of claim 15, further comprising:

receiving, by a set of input terminals of the inverter, DC power;

receiving, by a switch group of the inverter, a PWM signal from one or more of the main microcontroller or the safety controller;

generating, by the switch group of the inverter, alternating current (AC) power using the received PWM signal; and outputting, by a set of output terminals of the inverter, the generated AC power, wherein the one or more of the main microcontroller or the safety controller is configured to generate the PWM signal to operate the switch group.

17. The method of claim 16, further comprising:

receiving, by a motor connected to the output terminals of the inverter, the generated AC power from the inverter, and rotating based on the received AC power.

18. A system for a direct-current (DC) to alternating current (AC) inverter, the system comprising:

a memory configured to store instructions;

a safety controller configured to control the inverter;

a main microcontroller that is separate from the safety controller and configured to execute the stored instructions during non-timing-critical operation to output a signal to the safety controller; and a main microcontroller watchdog configured to monitor a health of the main microcontroller and output the health of the main microcontroller to the safety controller, wherein the main microcontroller watchdog is separate from the main microcontroller and the safety controller, and wherein the safety controller is configured to output a PWM signal to a switch group of the inverter based on the signal from the main microcontroller, the health of the main microcontroller, and one or more inputs from the inverter.

19. The system of claim 18, wherein the main microcontroller watchdog is configured to communicate with the safety controller using periodic Serial Peripheral Interface (SPI) messages and signals.

20. The system of claim 18, wherein the main microcontroller is configured to communicate with the safety controller using periodic Serial Peripheral Interface (SPI) messages, and when the health of the main microcontroller is in good condition, the main microcontroller is configured to override the one or more inputs from the inverter to the safety controller.

* * * * *